United States Patent [19]
Colombier et al.

[11] Patent Number: 5,484,751
[45] Date of Patent: Jan. 16, 1996

[54] METAL/METALLOID NITRIDE/CARBIDE CERAMIC POWDERS PREPARED BY FLASH PYROLYSIS

[75] Inventors: Christian Colombier, Ermont; Jean-Pierre Disson, Lyons; Jean-Pierre Cuer, Craponne, all of France

[73] Assignee: Elf Atochem S.A., Puteaux, France

[21] Appl. No.: 215,253

[22] Filed: Mar. 21, 1994

[30] Foreign Application Priority Data

Mar. 23, 1993 [FR] France .................................. 93 03305

[51] Int. Cl.⁶ .......................... C01B 31/30; C01B 21/06
[52] U.S. Cl. ................... 501/87; 501/88; 501/92; 501/96; 501/97; 501/98; 423/365; 423/371; 423/415.1; 423/382
[58] Field of Search ..................... 423/365, 371, 423/415.1, 382; 501/96, 87, 92, 88, 97, 98

[56] References Cited

U.S. PATENT DOCUMENTS

| | | | |
|---|---|---|---|
| 4,891,339 | 1/1990 | Colcote et al. | 501/87 |
| 5,055,431 | 10/1991 | Blum et al. | 501/96 |

OTHER PUBLICATIONS

Mizutani et al, *Ceramic Powder Science III*, p. 59, 1990.

*Primary Examiner*—C. Melissa Bonner
*Attorney, Agent, or Firm*—Burns, Doane, Swecker & Mathis

[57] ABSTRACT

Metal and/or metalloid nitride and/or carbide powders, e.g., amorphous or crystalline spherical particulates having a mean diameter greater than 0.2 μm 90% of which being less than 0.4 μm in size, well suited for the production of ceramic shaped articles exhibiting good thermomechanical properties and useful, for example, in the automotive and aeronautic fields, are prepared by flash pyrolyzing coarse drops of a precursor compound convertible into such nitride and/or carbide, at an elevated temperature and for such period of time as to convert the precursor compound into said amorphous or crystalline powder.

18 Claims, 2 Drawing Sheets

METAL/METALLOID NITRIDE/CARBIDE CERAMIC POWDERS PREPARED BY FLASH PYROLYSIS

BACKGROUND OF THE INVENTION

1. Field of the Invention

The present invention relates to the preparation, via flash pyrolysis, of ceramic powders based on metal and/or metalloid nitrides and/or carbides.

The present invention also relates to the amorphous or crystalline powders thus produced, having particle sizes in the nanometer range.

2. Description of the Prior Art

Processes for the production of silicon carbonitride powder are known to this art. Among these processes, exemplary thereof is a vapor-phase process (U.S. Pat. No. 4,036,653) employing tetrachlorosilane, ammonia and methane starting materials. The proportion of the silicon carbide and silicon nitride phases present in the final powder is determined by the composition of the initial gaseous mixture. This process presents the disadvantage of producing hydrochloric acid and ammonium chloride. The final silicon carbonitride powder has a specific surface higher than 1 $cm^2/g$ and contains 0.1% to 5% of carbon.

Gonsalves et al, *Advanced Materials*, 3, No. 4, pp. 202–204 (1991), describe a process which includes forming an aerosol by spraying fine droplets of a precursor material within a laser beam. The precursor employed is a mixture of monocyclic organosilazanes containing 6 and 8 atoms in the ring moiety and including a few linear oligomers. A diffuser equipped with ultrasound-generating means must be employed for forming the drops. The amorphous powder grains thus obtained have a mean diameter of 62 nm. The crystalline powder particles have a bimodal distribution in which the mean diameter values are 44.8 and 119.43 nm.

U.S. Pat. No. 4,594,330 describes a vapor-phase process which entails heating an organosilicon compound devoid of halogen and oxygen atoms. According to this process, the compound must be capable of being vaporized. This process makes it possible to produce an amorphous powder which has grains smaller than 0.2 µm in size, or a crystalline powder.

Mizutani and Liu, *Ceramic Powder Science III*, p. 59 (1990), describe the pyrolysis of polysilazanes in a conventional furnace. The process includes a stage of formation of fine droplets which have a diameter of a few micrometers, and this mandates that the polysilazane be employed in dilute solution. The amorphous powder thus obtained is in the form of particles which have a mean diameter of 0.38 µm, exhibiting a geometric standard deviation of 1.5.

SUMMARY OF THE INVENTION

A major object of the present invention is the provision of a novel process for the preparation of metal and/or metalloid nitride and/or carbide powders by flash pyrolysis from a precursor of said nitrides and/or carbides, comprising conveying coarse drops or droplets of said precursor into a vessel heated to such temperature and for such time interval that are sufficient to produce a powder. By the expression "coarse drops" are intended drops whose mean diameter is generally greater than 10 µm, preferably greater than 50 µm and more preferably ranging from 100 µm to 5 mm.

DETAILED DESCRIPTION OF BEST MODE AND PREFERRED EMBODIMENTS OF THE INVENTION

More particularly according to the present invention, the subject process produces an amorphous powder whose grains or particle sizes are greater than 0.2 µm in diameter. This process also permits the production of a crystalline powder either partially or completely comprising crystallites in the nanometer range, namely, smaller than 500 nm. The crystallinity of the powder thus obtained may be optionally increased by one or more appropriate heat treatments.

In the process according to the invention, coarse drops are formed, and this presents an essential advantage in that it is thus possible to employ a precursor that is liquid or fusible at the temperature of use without it being necessary to dilute it in a "conventional" solvent. By "conventional" solvents are intended all solvents devoid of atoms selected from among Si, Al, Ti and B.

Another advantage of the invention relates to the amorphous powder obtained, whose particle size permits controlling the proportion of oxygen. In the case of silicon and titanium nitride and/or carbide powders, it is known, in fact, that an increase in the surface area of the grains results in an increase of the silica or titanium oxide content via a mechanism of surface oxidation of the carbide and/or nitride. The oxides thus formed effect a decrease in the refractory nature of the ceramic.

Figure 1:
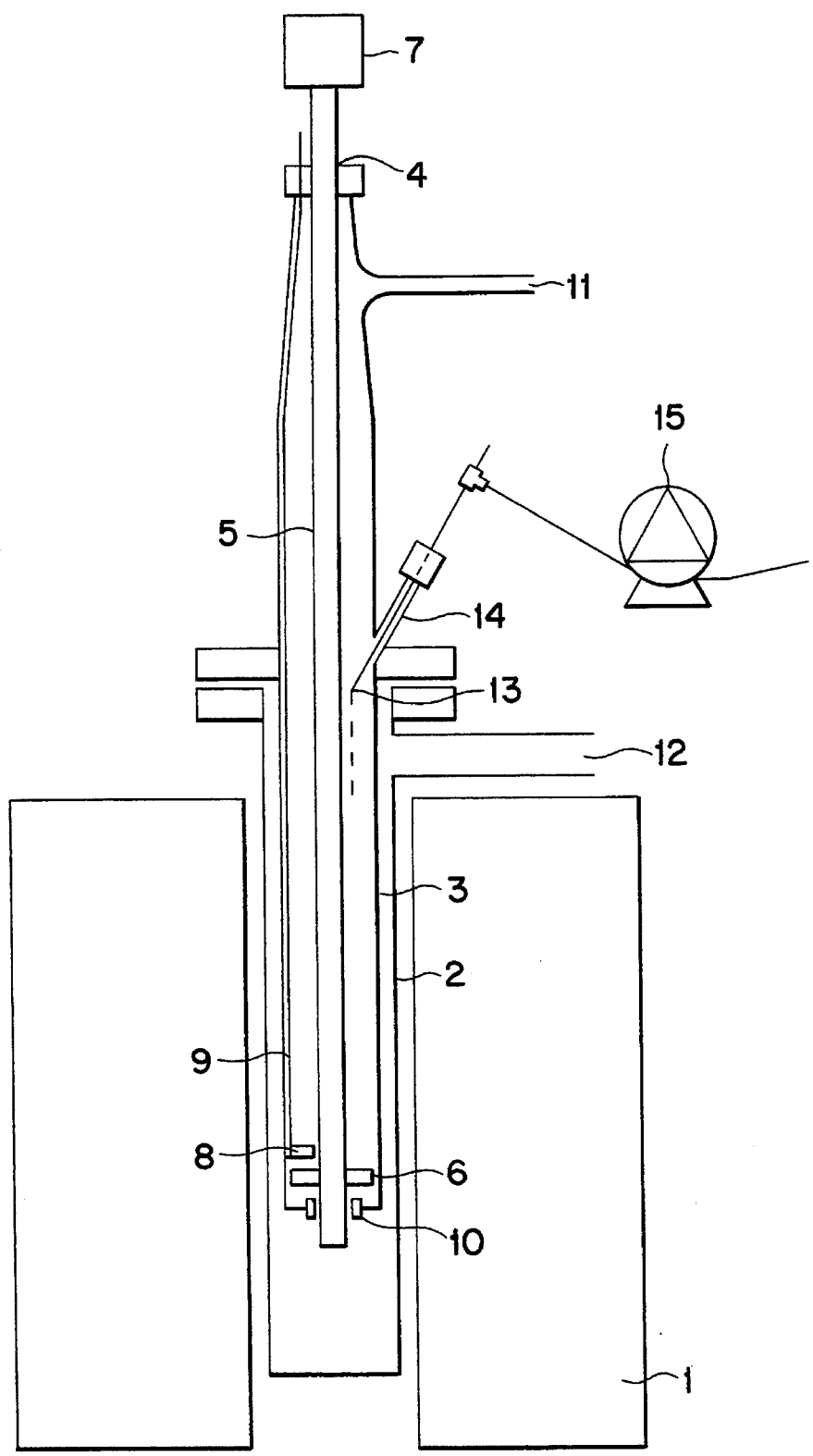
FIG. 1 is a schematic/diagrammatic cross-sectional view of one embodiment of the process/apparatus according to the present invention.
Figure 2:
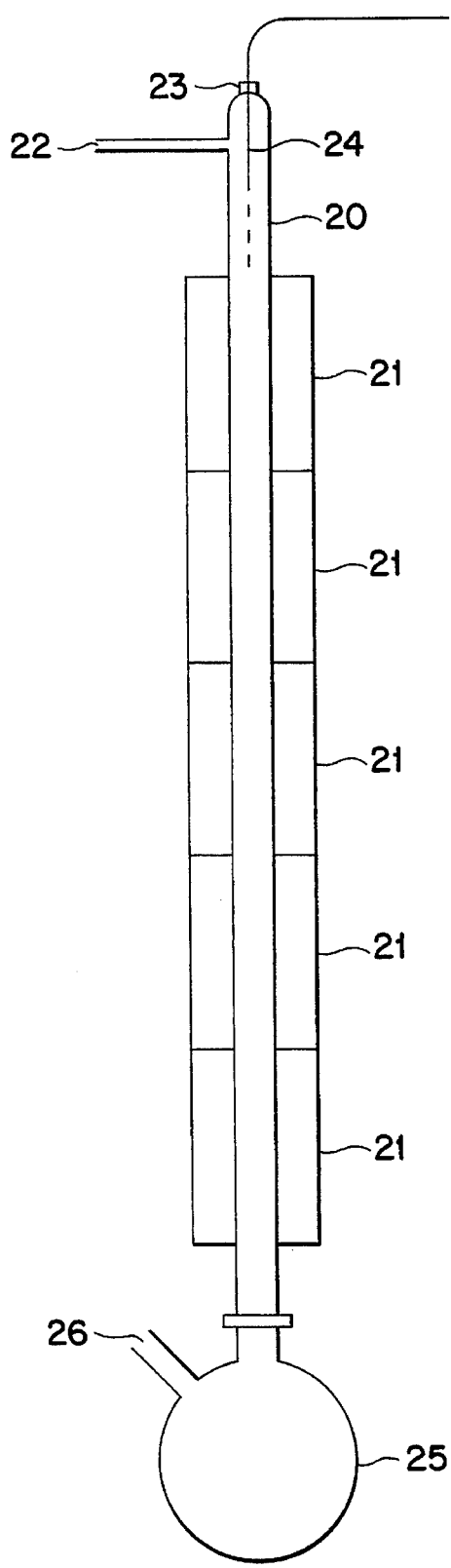
FIG. 2 is a schematic/diagrammatic cross-sectional view of another embodiment of the process/apparatus of the invention.

The process/apparatus of the invention are illustrated in the accompanying FIGS. 1 and 2.

FIG. 1 depicts an apparatus according to the invention, including a tubular furnace 1 for heating a set of tubes 2 and 3 defining a reaction vessel. Inside the tube 2, the base of which is closed, is placed the tube 3 which at its upper end, has an opening 4 allowing passage of the rod 5 to the lower end thereof, and to which a disc 6 is attached. The disc 6 is rotated by means of the rod 5 with the aid of the motor 7. Above the disc 6 there is provided a scraper 8 carried by the rod 9. The lower end of the tube 3 is internally provided with a guiding system 10 for the shaft of the rod 5.

Under appropriate conditions, a gas which is expelled through the vent 12 is introduced continuously through the side inlet tube 11 of the reaction tube 3. The function of this gas, which downwardly descends concurrently with the drops and with the powder being formed, is especially to remove the gases formed over the course of the flash pyrolysis. This gas may be selected from among nitrogen, argon, hydrogen, ammonia, helium and mixtures thereof, with nitrogen being preferred. The precursor contained in a receptacle (not shown) is introduced into the tube 3 through the capillary tube 13 inserted inside the tube 14. The rate of formation of the drops which form on exiting the tube 13 is determined by the feed rate of the pump 15. As they are being formed, the grains of powder are moved by the scraper 8 to the base of the tube 2.

An alternative embodiment of the apparatus according to the invention is shown in FIG. 2. The tube 20 is inserted into a heating system including a series of superposed tubular furnaces 21. The side tube 22 permitting gas to be introduced is placed at the upper end of the tube 20. A coupling 23 situated at the top of the tube 20 is equipped with a capillary tube 24 allowing the precursor material to be introduced. At its lower end, the tube 20 has a powder recovery system including, for example, a round flask 25 which at its upper end is provided with a vent 26 allowing gases to be removed.

The precursor according to the invention is advantageously selected from among compounds that are liquid or fusible below the temperature of formation of the powder. This temperature can vary depending on the nature of the precursor. Values of from 200° to 500° C. are indicated by way of example.

The precursor of the invention is selected from among the compounds which are convertible into a metal and/or metalloid nitride and/or carbide powder containing N, C, H, O and M atoms, wherein M is selected from among Si, Al, Ti and B and whose composition by weight is such that N=0–60%, C=0–40%, H=2–10%, O=0–10% and M=10–80%, with the proviso that N and C cannot at the same time be zero.

Exemplary such precursors include silicon derivatives such as polysilanes, polysilazanes and polysiloxazanes, and titanium derivatives such as the compounds prepared by reacting $Ti[N(CH_3)_2]_4$ with ammonia (see *J. Am. Ceram. Soc.*, 71 (1), pp. 72–82 (1988)).

The precursor according to the invention may advantageously comprise a mixture of metals and/or metalloids selected from among Si, Al, Ti and B. Exemplary thereof are polytitanocarbosilazanes (see EP-417,526), polytitanosilylhydrazines (see FR-2,670,789), polyaluminosilylhydrazines (see FR-2,670,789) and the compounds comprising a plurality of recurring structural units of the formula:

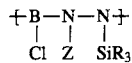

in which the radicals R, which may be identical or different, are each an alkyl radical having up to 12 carbon atoms, and Z is H or $SiR_3$, as well as the borazines of the formula:

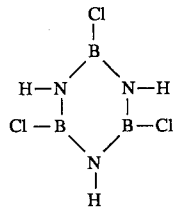

or those prepared by reacting ammonia with a silylhydrazine of the formula:

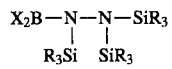

in which the radicals R, which may be identical or different, are each an organic radical having up to 12 carbon atoms and X is a halogen, especially Br or Cl (see EP-0,524,858).

A precursor that does not contain halogen atoms is advantageously selected because it avoids the formation of corrosive halogenated derivatives.

Preferred is a precursor having a solids yield of more than 50% defined by the equation:

$$T_R = \frac{M}{Mi} \times 100$$

in which:

$T_R$ represents the solids yield;

M represents the mass obtained after heating under a nitrogen atmosphere (from 25° C. to 500° C. at 100° C./h then 1 h at 500° C.);

Mi represents the initial weight of the precursor.

When the precursor according to the invention has a viscosity which is too high to permit the formation of coarse drops, a precursor of low viscosity may be added. For example, and especially when the precursor is a polysilane or a polysilazane, hexamethyldisilazane may be employed. To accomplish this, any appropriate mixtures are employed which permit attaining an adequate viscosity.

The temperature of the vessel in the process of the invention is adapted for the drops of the precursor to be abruptly heated to a high temperature, permitting the drops to be converted into powder. A temperature higher than 500° C. and preferably ranging from 600° to 1,700° C. is generally employed.

The time period of heating in the subject process is sufficient for the drops of precursor to be converted into a powder. For example, in the case of a drop 1 mm in diameter heated to 1,000° C., this time period may range from a few tenths of a second to a few seconds.

The present invention also features the powder thus obtained. Depending on the temperature of the vessel employed in the process of the invention, this powder may be in an amorphous or crystalline state.

At a temperature which is lower than 1,350° C., an amorphous powder is generally obtained which is characterized in that it contains N, C, H, O and M atoms, wherein M is a metal selected from among Si, Al, Ti and B and whose composition by weight is such that N=0–60%, C=0–40%, H=0.5–10%, O=0.8–10% and M=20–80%, with the proviso that N and C cannot simultaneously be zero. Depending on the precursor employed, this powder may contain one or more metals or metalloids selected from among those indicated above.

The amorphous powder according to the invention is also characterized in that it is infusible, insoluble at more than 1% by weight in toluene at 25° C. and in that it comprises particles of essentially spherical shape and more than 0.2 μm in diameter, exhibiting a homogeneous grain size distribution such that 90% of the particles have a diameter smaller than 0.4 μm.

At a temperature above 1,350° C. the powder obtained is in a completely or partially crystalline state, depending on the temperature employed. This powder is characterized in that the grains, of indefinite shape, comprise crystallites in the nanometer range and in that its chemical composition differs from that of the amorphous powder only by the fact that it does not contain any hydrogen atom.

In an alternative embodiment, it is possible to produce a partially or completely crystalline powder from the amorphous powder obtained above by heating this powder to a temperature of from 1,350° to 1,700° C. in a gaseous atmosphere. The nature of the gas employed is the same as that indicated above.

This amorphous or crystalline powder is particularly well suited for producing shaped ceramic articles exhibiting good thermomechanical properties. Such ceramics are advantageously used for the manufacture of wear components and cutting tools. These articles are particularly useful in the motor vehicle and aeronautics industries, for example, for the production of motor vehicle valves and rocker-arm pads, as well as aircraft turbines.

In order to further illustrate the present invention and the advantages thereof, the following specific examples are given it being understood that same are intended only as illustrative and in nowise limitative.

EXAMPLE 1

38.9 moles of ammonia were introduced gradually into a reactor at 0° C. containing 5.2 kg of toluene, 3.6 moles of $CH_3SiCl_3$ and 5.4 moles of $CH_3SiHCl_2$. An ammonium chloride precipitate was formed. The introduction of the ammonia was over a time period of 6 hours. After 17 hours at ambient temperature the solution containing the polysilazane was separated from the precipitate by filtration and rinsed with toluene. The toluene was removed by distillation at 75° C. at a pressure reduced to 100 mm of mercury.

The polysilazane recovered had a viscosity of 300 mPa.s at 50° C. and 40 MPa.s at 100° C. It exhibited a loss in weight of 25% when the temperature varied from abient to 300° C. The yield of ceramic after heating to 1,000° C. under a nitrogen atmosphere was 55%.

The polysilazane obtained was introduced into the apparatus shown in FIG. 1. The tubular furnace 1 had a working diameter of 70 mm. The diameters of the tubes 2 and 3 were 53 and 28 mm, respectively, and their length was 60 cm. The nitrogen was introduced at a flow rate of 30 l/h. The rate of rotation of the rod 5 was 50 rev/min. A drop whose diameter was approximately one millimeter was formed every 3 seconds. The temperature inside the tube 3 was 800° C. At the bottom of the tube 2 a dark-colored amorphous powder was recovered, whose mean grain diameter, evaluated by image analysis via examination using a transmission electron microscope, was 0.25 μm and in which 90% of the grains were smaller than 0.4 μm in size. This dark powder was next crystallized at 1,600° C. under nitrogen atmosphere. A loss in weight of 15% was measured. The powder grains thus formed had a diameter close to 2 μm and examination thereof by transmission election microscopy evidenced the presence of crystallites smaller than 100 nm in size. The composition of the powder, determined by X-ray diffraction, was 75% $\alpha Si_3N_4$, 5% $\beta Si_3N_4$ and 20% $\beta SiC$.

EXAMPLE 2

The procedure under the conditions of Example 1 was repeated, a modified apparatus being employed. This apparatus did not include the rod 5 fitted with the disc 6 and the stirring system 7. The capillary tube 13 allowing the polysilazane to be introduced was here inserted into the opening 4 and the bottom of the tube 2 comprised a quartz surface inclined at 45°.

A dark crosslinked powder was recovered, and scanning electron microscopy evidenced it to be grains with a diameter of from 0.2 to 0.5 μm and of nearly spherical shape. The composition of the powder was Si= 55.8%, C=13.6%, N=27.3% and O=2%.

This powder was introduced into a crucible and then heated to 1,600° C. under a nitrogen atmosphere. A loss in weight of 15% was determined. The composition was Si=62%, C=13.1%, N=23% and O=1%. It was determined by X-ray diffraction that the $\alpha Si_3N_4$ and $\beta SiC$ phases were predominant. The crystallite sizes of $\alpha Si_3N_4$, $\beta Si_3N_4$ and $\beta SiC$ were 650, 600 and 100 Å, respectively.

EXAMPLE 3

The procedure was carried out in the apparatus of FIG. 2. The tube 20, 3 m in length and 53 mm in diameter, was heated to 1,100° C. using five superposed tubular furnaces 21. The polysilazane obtained in Example 1, preheated to 100° C., was introduced into the tube 20 by means of the tube 24. The flow rate of the polysilazane was 20 g/h. Nitrogen was introduced through the tube 22 at a flow rate of 50 l/h.

A dark-colored nanocomposite powder was recovered at the base of the 10-liter flask 25. The chemical composition of the powder and the appearance of the grains, determined by scanning electron microscopy, were substantially the same as those of the powder obtained in Example 2.

EXAMPLE 4

The apparatus of FIG. 2 was employed to produce a powder from different polysilazanes and gases. The composition of the powder formed by pyrolysis at 1,000° C. is reported in the following Table:

Polysilazane A: ammonolysate obtained according to Example 1.

Polysilazane B: polysilazane derived from hydrazine of composition Si=33%, C=36%, N=21%, H= 7.5%, containing $9.1 \cdot 10^{-3}$ mol/g of —Si—C≡C— recurring structural units and having a viscosity of 20 mPa.s at 150° C. This compound is marketed by Elf Atochem under the trademark Pyrofine® PV.

Polysilazane C: compound resulting from the reaction of a mixture of chlorosilanes including one containing bonds of ≡Si-H type with ammonia, hydrazine and water. This compound, prepared according to the procedure of Example 5 of published European Patent Application No. 88403263.2, modified in that 0.8 mol of $SiHCH_3Cl_2$ and 0.2 mol of $Si(CH_3)_2Cl_2$ were employed, is marketed by Elf Atochem under the trademark Pyrofine® PM.

TABLE

| Polysilane | Gas | Elemental Analysis (%) | | | |
|---|---|---|---|---|---|
| | | Si | C | N | O |
| A | $N_2$ | 55.8 | 13.6 | 27.3 | 2.0 |
| B | $N_2$ | 47.0 | 23.5 | 20.0 | 9.2 |
| | Ar | 46.5 | 24.5 | 22.3 | 6.0 |
| | $NH_3$ | 50.0 | 2.6 | 37.1 | 5.9 |
| C | $N_2$ | 55.0 | 14.0 | 25.0 | 6.7 |
| | Ar | 55.0 | 14.0 | 25.0 | 6.7 |
| | $NH_3$ | 51.5 | 0.3 | 36.6 | 5.4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an amorphous or crystalline carbide and/or nitride powder of a metal and/or metalloid, comprising flash pyrolyzing coarse drops having a diameter greater than 10 μm of a precursor compound convertible into such nitride and/or carbide, at an elevated temperature and for such period of time as to convert said precursor compound into said amorphous or crystalline powder.

2. The process as defined by claim 1, said precursor compound comprising the atoms N, C, H, O and M, wherein M is selected from among the elements Si, Al, Ti, B and whose composition by weight is such that N= 0–60%, C=0–40%, H=2–10%, O=0–10% and M= 10–80%, with the proviso that N and C cannot at the same time be zero.

3. The process as defined by claim 1, said precursor compound being liquid or fusible at a temperature which is less than the temperature of formation of the said amorphous or crystalline powder.

4. The process as defined by claim 1, said precursor compound being diluted in at least one other precursor compound of lesser viscosity.

5. The process as defined by claim 1, comprising channeling said coarse drops through a heated reaction vessel.

6. The process as defined by claim 5, the temperature of said reaction vessel being higher than 500° C.

7. The process as defined by claim 6, said temperature ranging from 600° to 1,700° C.

8. The process as defined by claim 5, said coarse drops downwardly descending through said heated reaction vessel.

9. The process as defined by claim 8, comprising concurrently circulating a gas selected from among nitrogen, argon, hydrogen, ammonia, helium, or mixture thereof, with the path of travel of said coarse drops and said powder produced therefrom.

10. The process as defined by claim 1, said drops of precursor compound having a diameter greater than 50 μm.

11. The process as defined by claim 10, said drops of precursor compound having a diameter ranging from 100 μm to 5 mm.

12. The process as defined by claim 1, comprising heating any amorphous or partially crystalline powder thus prepared to a temperature that increases the crystallinity thereof.

13. The process as defined by claim 12, said temperature ranging from 1,350° to 1,700° C.

14. The process as defined by claim 3, said heated reaction vessel comprising a vertical tube.

15. The process as defined by claim 1, said precursor compound comprising a polysilane, polysilazane, polysiloxazane, or titanium derivative.

16. The process as defined by claim 1, said precursor compound comprising a polytitanocarbosilazane, polytitanosilylhydrazine, polyaluminosilylhydrazine or borazine.

17. The process as defined by claim 1, said precursor compound comprising recurring structural units of the formula:

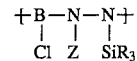

in which the radicals R, which may be identical or different, are each an alkyl radical having up to 12 carbon atoms, and Z is hydrogen or $SiR_3$.

18. The process as defined by claim 1, said precursor compound comprising the reaction product of ammonia with a silylhydrazine of the formula:

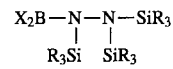

in which the radicals R, which may be identical or different, are each an organic radical having up to 12 carbon atoms, and X is a halogen atom.

* * * * *